July 7, 1959 E. W. JAHN ET AL 2,893,078
ADHESIVE DEPOSITOR FOR SHELL MOLD BONDING APPARATUS
Filed May 2, 1958 3 Sheets-Sheet 1

INVENTORS
EARL W. JAHN
MARVIN C. PREMO

BY Chapin & Neal

ATTORNEYS

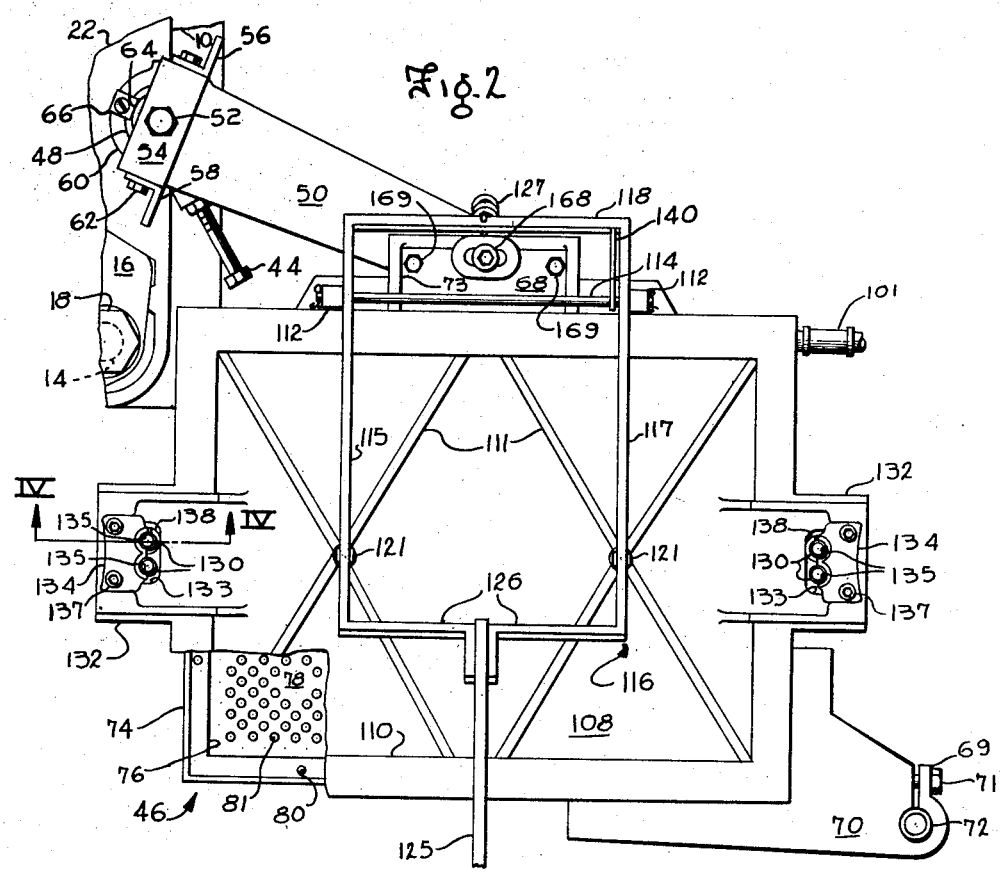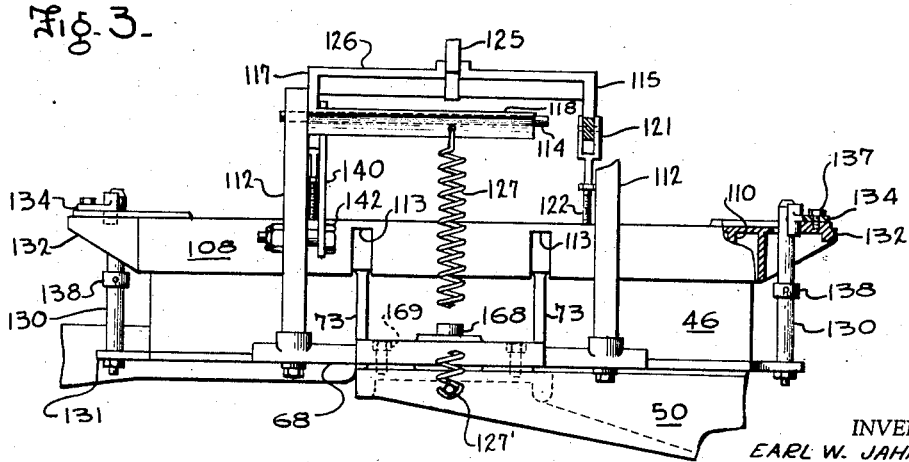

July 7, 1959     E. W. JAHN ET AL     2,893,078
ADHESIVE DEPOSITOR FOR SHELL MOLD BONDING APPARATUS
Filed May 2, 1958     3 Sheets-Sheet 3

INVENTORS
EARL W. JAHN
MARVIN C. PREMO

BY Chapin & Neal

ATTORNEYS

United States Patent Office 2,893,078
Patented July 7, 1959

2,893,078
ADHESIVE DEPOSITOR FOR SHELL MOLD BONDING APPARATUS

Earl W. Jahn and Marvin C. Premo, Springfield, Mass., assignors to Production Pattern & Foundry Co., Chicopee, Mass., a corporation of Massachusetts Application May 2, 1958, Serial No. 732,548

4 Claims. (Cl. 22—31)

This invention relates to shell bonding apparatus and more particularly to novel means for depositing liquid adhesive material on the parting line surfaces of shell molds.

In the shell mold process two half molds are formed by thermosetting and heat curing a sand-resin mixture on pattern plates. The mold halves are stripped in a hot condition from the pattern plates, each half having one or more cavities and peripheral flanged portions called parting line surfaces. A resinous bonding material or adhesive is then deposited on the hot lower or drag half of the mold and the upper or cope half of the mold is registered therewith. The parting line surfaces of the mold halves are then held together under pressure until the bonding resin is thermoset by the residual heat of the molds and securely bonds the two half molds together.

In these mold operations a dry or powder type bonding material is widely used and while a good bond is achieved with this material foundry drafts sometimes displace portions thereof into the mold cavities resulting in castings having surface defects. One solution to this problem is in the use of liquid or paste type bonding material but at the present time such materials are applied manually. It can be readily appreciated that such manual operations are slow and the accuracy of the application depends in large measure on the skill and care of the individual workman.

It is, therefore, an object of this invention to provide novel means for accurately and rapidly depositing liquid adhesive material on shell mold parting line surfaces wherein no special skill is required of the operator.

It is another object of this invention to provide novel means quickly and simply adjustable for depositing liquid adhesive material over differently shaped and intricate parting line surfaces.

This invention is characterized by a container having liquid adhesive material therein, and having means for releasing the liquid from the container in predetermined patterns on the parting line surfaces of shell molds.

These and other objects and advantages of this invention will be apparent from a reading of the following specification.

In the drawings which form a part of the specification:

Fig. 2 is a plan view of the liquid adhesive depositor of Fig. 1 with parts cut away and showing the mounting of the depositor on the bonding machine;

Fig. 3 is a rear elevation of the depositor with parts cut away;

Fig. 4 is a left side elevation of the depositor and mounting of Fig. 2 with parts cut away;

Fig. 5 is a detailed showing in enlarged scale and partly in section of a valve member, a plurality of which are shown in Fig. 4; and Fig. 6 is a section taken along the lines VI—VI of Fig. 2 and on an enlarged scale.

Figure 1:
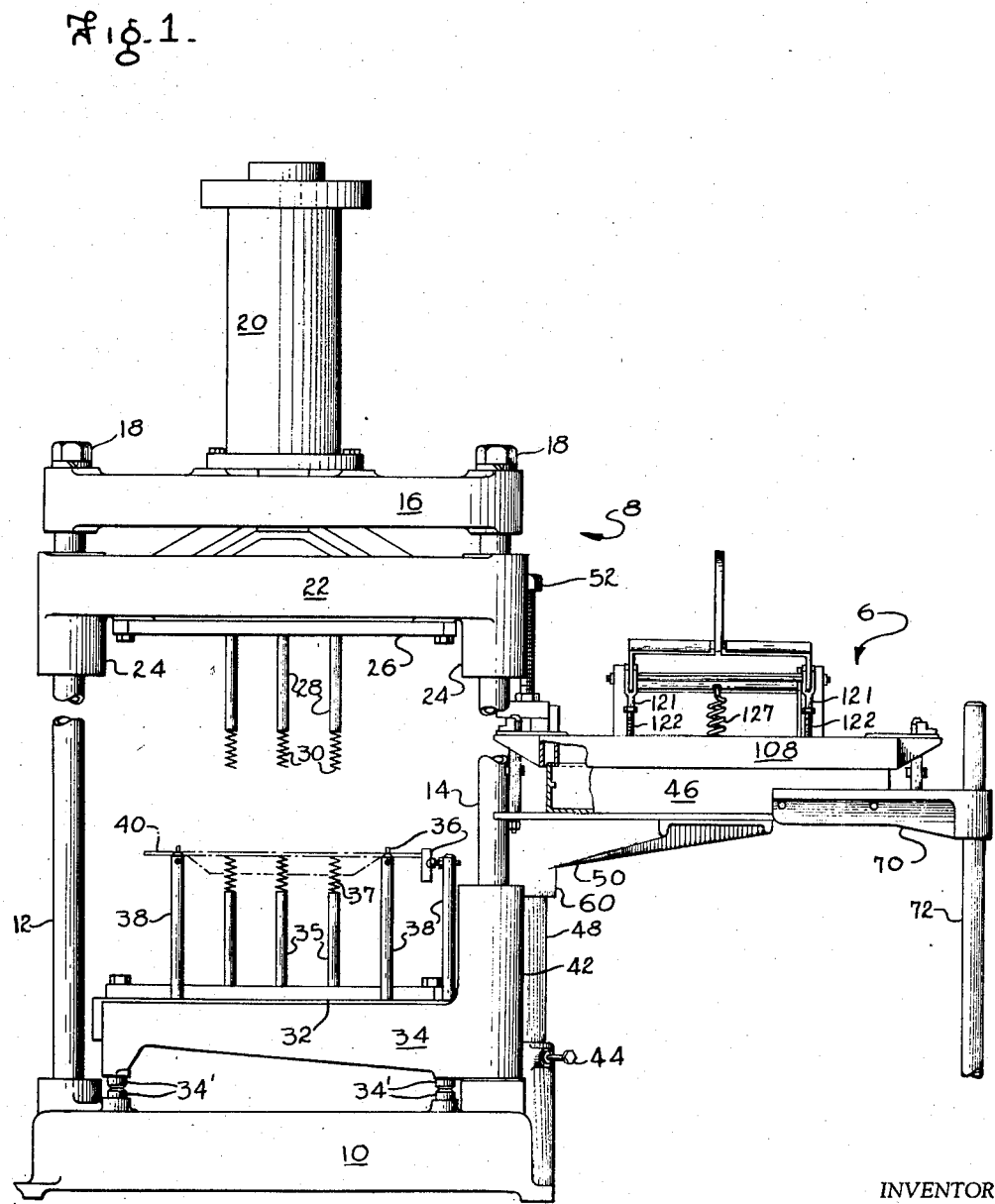
Fig. 1 is a front elevation, with parts cut away of a liquid adhesive depositor mounted on a shell bonding machine.

The liquid adhesive discharge device or depositor of this invention is shown generally at 6 in Fig. 1 and may be mounted on a shell bonding apparatus of conventional construction which is indicated generally at 8 in this figure.

The bonding apparatus 8 comprises a rectangular base 10 with columns 12 and 14 extending vertically upward from diagonally opposite corners of the base and a cross bar 16 supported by the terminal portions of columns 12 and 14 and held in position by nuts 18. A pressure cylinder 20 is mounted on the cross bar 16 and has a plunger rod (not shown) connected to a pressure shoe 22 which is slidably mounted on columns 12 and 14 by sleeve extensions 24. An upper pressure plate 26 is mounted on the underside of shoe 22 in which are carried a plurality of depending elongated pressure posts or pins, three of which are shown at 28, with springs 30 extending downwardly therefrom. A lower pressure plate 32 is mounted on the upper surface of shoe 34 and is also provided with a plurality of pressure pins 35 and springs 37 arranged to be in opposing vertical alignment with the pins 28.

The shoe 34 is rotatably mounted by a hub 42 on the column 14 and may be swung outwardly under the depositor 6 for receiving a deposit of bonding material on the parting line surfaces of the drag half of a shell mold 40 shown in dotted fashion supported by springs 37. An adjustable stop nut 44 is provided to engage a portion of shoe 34 to insure proper registration of the mold 40 beneath the depositor 6. After adhesive material is deposited on mold 40, in a manner to be described below, shoe 34 may be swung back to its position as shown in Fig. 1, and the upper or cope half of the mold placed thereon. Shoe 34 is provided with a plurality of upstanding posts 38 for supporting alignment fingers 36 to insure correct registration of the shell mold halves and alignment of their parting line surfaces with the springs 30 and 37. With the mold halves in registered position and supported by springs 37, cylinder 20 may be actuated by conventional control means to move pressure plate 26 downwardly until the springs 30 and 37 firmly clamp the parting line surfaces of the two mold halves. Pressure is maintained until the adhesive material has firmly bonded the two mold halves together; this bonding occurs when the adhesive resin is thermoset by the heat of the mold halves. Shoe 34 and base 10 are provided with vertically opposing pins 34' which engage to support shoe 34 when in its position shown in Fig. 1.

The adhesive discharge device 6 includes a tray 46 (Figs. 1, 2, 3 and 4) which is mounted adjacent the shell bonder 8 in the following manner. Cantilever brackets 50 and 70 are connected to rear and front portions of tray 46 respectively and are vertically supported by upstanding posts 48 and 72 respectively. As seen in Fig. 2, the post 48 is disposed adjacent the edge of base 10 and to the rear of column 14. The post 72 may be supported by a flanged base (not shown) resting on the floor adjacent the bonder 8. As seen in Figs. 2 and 3, the bracket 50 extends outwardly and forwardly from post 48 and is secured to a rear extension 68 of tray 46 by a bolt 168 and screws 169. Ribs 73 (Fig. 3) of extension 68 and tray 46 provide additional support for the tray 46.

Both brackets 50 and 70 are slidably mounted on their respective support posts 48 and 72 to enable the height of tray 46 to be adjusted. As seen in Figs. 2 and 4 a jack screw 52 is threaded through cross arm 54 and its lower end bears against a washer 55 welded to the upper surface of post 48. A cylindrical bore in the lower end of screw 52 receives an alignment pin 53 extending upwardly from the center of washer 55. Angle irons 56 and 58 are secured to the outer edges of the cross bar 54 and extend downwardly to a sleeve extension 60 of bracket 50 where they are secured by screws 62. Post 48 is provided with a keyway 64 which receives keys 66 secured interiorly of sleeve 60 to insure rectilinear vertical movement of bracket 50. Bracket 70 is provided with a split sleeve extension 69 and screw 71 (Fig. 2).

By rotation of jack screw 52 the tray 46 may be adjusted to its proper height. A lock nut 66 on screw 52 and screw 71 may then be set to maintain the tray 46 in its desired position.

As best seen in Figs. 2 and 4 the tray 46 is formed by vertical sides 74 rectangularly arranged and having an open top and bottom. A narrow rim 76 extends inwardly from the lower edges of sides 74 and provides a mounting frame for a multi-apertured injector plate 78 secured thereto by screws 80. There are approximately 1900 closely spaced apertures 81 arranged through plate 78 and generally coextensive with the plate area. Disposed in each of these apertures 81 is a valve member 82, some of which are shown in Fig. 4.

As seen in Fig. 5, each valve member 82 comprises a lower cylindrical or tubular member 84, having an outer diameter slightly greater than the diameter of aperture 81, and an upper tubular member 86, the lower portion of which has a reduced outer diameter providing a shoulder 88. Member 86 is provided with an axial bore 96 of uniform diameter throughout its length and open at its upper and lower ends. The member 84 is provided with a bore 87 opening at its upper end and having a lower opening 85 of reduced diameter provided by annular rim 89. The shoulder 88 rests against the upper surface of plate 78, peripherally of the aperture 81, and the lower portion of reduced diameter of member 86 extends downwardly through the aperture 81. The member 84 is threaded to receive the threaded lower end of the member 86 as at 90, the upper surface of the member 84 engaging the lower surface of plate 78, peripherally of the aperture 81; the engagement of the members 84 and 86 with the plate 78 seals the aperture 81. A ball 94 is urged upwardly by coil spring 92 seated on rim 89 within bore 87 and closes off the lower end of bore 96 of the upper member 86. A port 98 is provided through the body of member 86 a short distance above shoulder 88 to provide communication for bore 96 with the interior of tray 46 which is at least partially filled with a thermosetting liquid resinous bonding material 100 (Fig. 4) having a viscosity of about SAE 20-30. As seen in Fig. 2, a pipe 101 may be provided for the purpose of keeping the tray 46 supplied with liquid adhesive. With a valve 82 disposed in each of the apertures 81, the check valve action of balls 94 and springs 92 will seal all the apertures 81 and no liquid 100 will be permitted to flow from the tray 46. As just described, the valves 82 are in a normally inoperable condition. Portions of the liquid 100 in tray 46 entering ports 98 of the valves 82 will be supported in columns in bores 96 by the balls 94.

To render a valve 82 operable a removable piston pin 102 (Figs. 4 and 5) is inserted downwardly into the bore 96. The pin 102 having a diameter slightly smaller than bore 96 is provided with a head portion 104 and a compression spring 106 seated between head 104 and the upper annular surface of member 86 to hold pin 102 in an upward position, as shown in Fig. 5, with its lower end above port 98. The valve 82 may be actuated by forcing the pin 102 downwardly within bore 96 to close off port 98 and exert a pressure on liquid in the bore 96 to unseat ball 94. The ball 94 is of such a diameter as to permit the liquid to flow through bore 87 and out through opening 85. Spring 92 will reseat ball 94 to close off bore 96 when the pressure exerted on liquid in bore 96 is relieved.

Depending upon the configuration of the parting line surfaces of the shell molds upon which bonding material is to be deposited, a pin 102 is inserted in each of a number of selected valves 82. A means to simultaneously actuate each of these selected valves is provided in the form of a push plate 108 (Figs. 1, 2 and 4) having a flat lower surface 109 generally coextensive with the area covered by the apertures 81 in the plate 78. The surface 109, as seen in Fig. 4, engages the heads 104 of pins 102 and forces these pins downwardly when the plate 108 is moved vertically downward in a manner to be described below. The marginal portions of surface 109 are recessed by the provision of a U-shaped skirt 110 adapted to register with the upwardly extending sides 74 of the tray 46. As seen in Fig. 3, the rear face of skirt 110 is provided with downwardly opening notches 113 to register with the ribs 73 extending upwardly from the extension 68. The skirt 110 is provided to keep foreign matter out of the tray 46 to prevent fouling of the valves 82 and contamination of the liquid 100. It will be noted that with the plate 108 in its normal position, as seen in Fig. 4, there is little chance that foreign matter will be blown into the tray by foundry drafts. It will be noted that the upper surface of plate 108 is provided with ribs 111 (Fig. 2) to increase the rigidity of the plate.

Means for mounting the push plate 108 is provided by posts 112 upwardly extending from the upper surface of the rear extension 68 of tray 46 as best seen in Figs. 2 and 3. A rod 114 is horizontally supported adjacent each end by the posts 112, adjacent their upper ends. A rectangular handle bracket 116 is rotatably mounted by its side members 115 and 117 on the rod 114. Rearwardly of the rod 114, the members 115 and 117 are connected by a cross member 118; a spring 127 is connected by one end to the member 118 and by the other end to a screw 127' extending outwardly of the support bracket 50. Forwardly of rod 114 the members 115 and 117 receive pivotally mounted fork members 121 (Figs. 3 and 4). Studs 122 extending upwardly from threaded bosses 123 on the upper surface of plate 108 are threaded into the fork members 121. Lock nuts 124 secure the studs 122 in place and provide for adjustment thereof. Forwardly of fork members 121 side members 115 and 117 are provided with inwardly extending portions 126 (Fig. 2) which capture and may be welded to the rear portion of a forwardly and upwardly extending handle 125. While the normal operating position of push plate 108 is shown in Fig. 4, for the purpose of inserting operating pins 102 in selected valves or servicing the valves 82 and interior of tray 46, plate 108 may be rotated upwardly to the position shown in dotted fashion. Upward movement of handle 125 pivots members 115 and 117 about the rod 114 which provides a fulcrum therefor. The studs 122 pull plate 108 upwardly and spring 127 pulls downwardly on cross member 118 to assist in the upward movement of plate 108. A latch 140 pivotally supported by a post 112 as at 142 (Fig. 3) engages the upper edge of cross member 118 to hold the plate 108 in this upward position; the operator may arrange a number of pins 102 with springs 106 in selected valves 82 to render the valves operable by downward movement of plate 108 to insure deposit of liquid adhesive only on the parting line surfaces of the mold to be bonded. This selection may be done by measurement, pattern or trial and error. Once the selection is made the plate 108 should be returned to its normal position shown in Fig. 4.

To provide for vertical rectilinear movement of plate 108 in the depression of the pins 102 to insure uniform actuation of these pins, a guide means is provided. With uniform actuation of pins 102, the ports 98 of selected valves will be simultaneously closed off and a uniform pressure exerted on liquid in bores 96. Each selected valve 82 will thus deposit substantially the same amount of bonding agent on the parting line surfaces of a shell mold. This guide means includes two upstanding guide posts 130 bolted to the upper surfaces of extensions 131 extending outwardly of each side of tray 46 (Fig. 3). Plate 108 is provided with similarly disposed side extensions 132 (see also Fig. 6) apertured as at 133 to receive the posts 130. A flanged guide 134 is attached by its flanged portion to the upper surface of each extension 132 by screws 137. The guides 134 are provided with vertically extending semi-cylindrical inner surfaces 135 conforming with the outer surface portions of posts 130; the surfaces 135 are disposed inwardly of the outer edge of aperture 133 for engaging outer surface portions of posts 130. A fixed collar 138 is mounted on the rear post 130 on each side of tray 108. The lower surfaces of guides 134 and the upper surfaces of collars 138 provide a stop for the downward movement of push plate 108 which has a travel of approximately 1½ inches. With this relatively short travel the guide members 134 engaging the four guide posts 130 provide for substantial vertical rectilinear movement of plate 108 even though members 115 and 117 are pivotally mounted on rod 114.

For operation of the depositor 6, the drag half of a shell mold 40 is registered below the depositor as described above. The handle 125 is pulled downwardly against the tension of the spring 127 and the springs 106 on pins 102 which have been inserted in selected valves 82. With the guide members 134 engaged with the posts 130, the push plate 108 uniformly depresses the pins 102 downwardly in the bores 96 of the selected valves 82. Liquid 100 in tray 46 will have entered ports 98 and be held in columns of predetermined height in the bores 96 by balls 94 of the selected valves 82. As the push plate 108 is moved downwardly, the lower portion of the pins 102 will close off ports 98 and exert a pressure on the liquid in the bores 96 which will unseat the balls 94 from bores 96 against the tension of springs 92. The liquid in the bores 96 will be squirted or dropped from the openings 85 of the selected valves. If the valves 82 containing the pins 102 have been properly selected the liquid 100 will drop only onto the parting line surfaces of the drag mold 40. It is apparent that the valves 82 which have not been provided with pins 102 will not be actuated by plate 108 and no liquid will pass through these valves. When the pressure exerted on the liquid in bores 96 is relieved, the springs 92 will reseat balls 94 and a predetermined amount of liquid will have been squirted from each of the selected valves 82, the downward movement of plate 108 being arrested by the stop means including collars 138 and guide members 134. With the release of handle 125 springs 106 will force the pins 102 and consequently also the push plate 108 upwardly to its normal position, spring 127 assisting in this upward movement. It may be noted that as pins 102 move upwardly a partial vacuum may be produced in bores 96 of the valves 82 and as the pins 102 uncover ports 98, liquid 100 will be sucked into the bores 96 and be again supported in columns therein by valves 82 until the next deposit is made.

It may be necessary for the operator, before commencing operations, to make a trial run which will insure that all the selected valves 82 are properly primed with a predetermined amount of liquid adhesive material.

As soon as the operator has completed the downward movement of handle 125 he is free to return the drag half mold to its position in the bonding apparatus as by swinging shoe 34 to its position shown in Fig. 1. The valves 82 as explained above will always be primed with liquid at the end of each deposit as long as the tray is kept supplied with liquid material.

If any deposit is not exactly on the parting line surfaces as desired, this may be remedied by the mere shifting or removal of one or more actuating pins 102. Furthermore, if a mold having differently configured parting line surfaces is to be bonded, by simply rearranging the pins 102, the operation may be immediately resumed without the necessity of preparing new patterns or other time consuming operations.

While the liquid depositor of this invention has been disclosed in mounted relationship with a particular bonding apparatus such utilization is not considered limiting. This depositor may be provided as a completely separate unit having its own separate mounting and means for receiving a drag mold; the operator would then place a drag mold on this receiving means and operate the depositor. The mold could then be removed and returned to a bonding machine. Another embodiment within the contemplation of this invention would be the provision of a mounting enabling an operator to swing the liquid depositor into vertical registration with a shell mold half while the mold is in its operative position in the bonding machine.

Having thus described our invention what we claim is:

1. An adhesive discharge mechanism for depositing liquid adhesive material on parting line surfaces of shell molds in shell bonding operations, comprising a tray at least partially filled with liquid adhesive material; a plurality of valve controlled openings in the bottom of said tray, each of the valves comprising a body having an interior bore, a pressure actuated check valve in the lower end of said bore, and a port in said body above said check valve opening from said bore interiorly of said tray; operating pins inserted in the upper ends of the bores of selected valves, a spring holding the lower end of each pin above said port, and a movable plate for engaging the upper ends of said pins to simultaneously push the pins downwardly within the bores of the selected valves to close off said ports and exert a pressure on liquid within said bores to open said check valves and eject liquid from the selected valves.

2. An adhesive discharge mechanism for depositing liquid adhesive material on parting line surfaces of shell molds in shell bonding operations comprising a tray, including a bottom plate having a plurality of apertures therethrough, a valve disposed in each of said apertures and having an internal bore therethrough and including a closure member normally sealing said bore, said valve comprising a first tubular member having a portion extending through the aperture and a second tubular member receiving said portion of the first tubular member, portions of said tubular members sealingly engaging the upper and lower surfaces of said plate adjacent said aperture, a port opening from said bore to the interior of said tray above said closure member, operating pins having lower portions inserted in the bores of selected valves, each pin being spring supported in an upward position with the lower end thereof above said port, a push plate mounted to overlie said bottom plate and including a flat surface having an area coextensive with said apertures, means for moving said push plate and means for constraining said push plate to substantial vertical rectilinear movement when the push plate is in engagement with said pins whereby downward movement of said push plate moves the pins to simultaneously close off the ports and exert a uniform pressure on liquid in the bores to open the closure members of selected valves and release liquid therefrom.

3. An adhesive discharge mechanism for depositing liquid adhesive material on parting line surfaces of shell molds in shell bonding operations comprising a tray including a plurality of closely spaced apertures in a bottom plate thereof arranged to be generally coextensive with said bottom plate, a valve member disposed in each of said apertures and comprising a lower tubular member having an outer diameter larger than said apertures and an upper tubular member having an internal bore and a lower portion of reduced outer diameter providing a shoulder and adapted to fit through said apertures and be engaged interiorly of said lower member, the upper portion of said lower member and the shoulder of said upper member sealingly engaging the lower and upper surfaces of said plate adjacent the aperture, said lower member including spring and ball elements interiorly supported by an apertured lower rim, said ball being normally held upwardly by said spring to seal off the bore of said upper tubular member, a port located above said shoulder and opening from the bore to the interior of said tray, upstanding operating pins having lower portions inserted in the bores of selected of said valves and each pin being spring biased in an upward position with the lower end thereof at a height above said port, a push plate pivotally mounted on said tray and having a flat surface overlying and generally coextensive with said bottom plate, means for moving said push plate downwardly to engage and depress said actuating pins, a plurality of upstanding guide posts mounted on extensions on each side of said tray, apertured side extensions on said push plate for receiving said posts, and guide members including semicylindrical surfaces vertically extending within the apertures of said side extensions for engaging the guide posts on each side of said tray to constrain the push plate to substantial vertical rectilinear movement when said push plate is in engagement with the operating pins.

4. An adhesive discharge mechanism for depositing liquid adhesive material on parting line surfaces of shell molds in shell bonding operations, said mechanism comprising a tray having upstanding sides and including a bottom plate with a plurality of closely spaced apertures therethrough arranged to be generally coextensive with said plate, a valve member disposed in each of said apertures and comprising a lower tubular member having an outer diameter larger than said apertures and an upper tubular member having an internal bore and a lower portion of reduced outer diameter providing a shoulder and adapted to fit through said apertures and be engaged interiorly of said lower member, the upper portion of said lower member and the shoulder of said upper member engaging the lower and upper surfaces of said plate adjacent the aperture, spring and ball elements interiorly supported by an apertured lower rim of said lower member, said ball being normally held upwardly by said spring to seal off the bore of said upper member, a port located above said shoulder and opening from the bore to the interior of said tray, upstanding operating pins having lower portions inserted in the bores of selected of said valves and each pin being spring biased in an upward position with the lower end thereof at a height above said port, a push plate pivotally mounted on said tray and having a flat surface overlying and generally coextensive with said bottom plate, marginal portions of said flat surface being recessed to form a U-shaped skirt for registry with the upwardly extending sides of said tray, and means for moving said push plate downwardly to engage and depress said actuating pins.

References Cited in the file of this patent
UNITED STATES PATENTS

| | | |
|---|---|---|
| 1,199,913 | Morrill | Oct. 3, 1916 |
| 1,889,036 | Lanier | Nov. 29, 1932 |
| 1,936,104 | Bizzarri | Nov. 21, 1933 |
| 2,231,694 | Stevens | Feb. 11, 1941 |
| 2,296,861 | Matter | Sept. 29, 1942 |

OTHER REFERENCES

American Foundryman (publication) May 1954, page 143 relied on.

Foundry (publication) October 1955, pages 102–114.